United States Patent
Scarff

(10) Patent No.: US 9,466,130 B2
(45) Date of Patent: Oct. 11, 2016

(54) SYSTEMS AND METHODS FOR ENHANCING DISPLAYED IMAGES

(71) Applicant: Goodrich Corporation, Charlotte, NC (US)

(72) Inventor: Lawrence Scarff, Burlington, MA (US)

(73) Assignee: Goodrich Corporation, Charlotte, NC (US)

( * ) Notice: Subject to any disclaimer, the term of this patent is extended or adjusted under 35 U.S.C. 154(b) by 123 days.

(21) Appl. No.: 14/270,873

(22) Filed: May 6, 2014

(65) Prior Publication Data

US 2015/0325008 A1  Nov. 12, 2015

(51) Int. Cl.
| | |
|---|---|
| *G06T 5/00* | (2006.01) |
| *G06T 11/00* | (2006.01) |
| *G06T 11/60* | (2006.01) |
| *G09G 5/377* | (2006.01) |
| *G06F 3/01* | (2006.01) |

(52) U.S. Cl.
CPC ............. *G06T 11/001* (2013.01); *G06T 5/008* (2013.01); *G06T 11/60* (2013.01); *G09G 5/377* (2013.01); *G06F 3/013* (2013.01); *G06T 2207/10024* (2013.01); *G06T 2207/10048* (2013.01); *G06T 2207/20104* (2013.01); *G06T 2207/20208* (2013.01); *G06T 2207/20221* (2013.01); *G06T 2210/36* (2013.01); *G09G 2320/0271* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 6,078,349 | A | 6/2000 | Molloy | |
| 2004/0075744 | A1* | 4/2004 | Newman | H04N 1/6072 348/207.1 |
| 2004/0207635 | A1* | 10/2004 | Miller | H04N 1/00 345/617 |
| 2005/0104900 | A1* | 5/2005 | Toyama | G06T 5/007 345/629 |
| 2006/0104545 | A1* | 5/2006 | Matsumoto | G06T 15/08 382/302 |
| 2011/0273466 | A1* | 11/2011 | Imai | G09G 3/20 345/589 |
| 2012/0206470 | A1* | 8/2012 | Frank | H04N 1/4078 345/581 |
| 2013/0238394 | A1 | 9/2013 | el Kaliouby et al. | |

FOREIGN PATENT DOCUMENTS

WO  WO-2014061462 A1  4/2014

OTHER PUBLICATIONS

Search Report and Opinion issued by the European Patent Office on Jun. 23, 2015 for European Patent Application No. 15166446.

* cited by examiner

*Primary Examiner* — Xiao Wu
*Assistant Examiner* — Steven Elbinger
(74) *Attorney, Agent, or Firm* — Locke Lord LLP; Scott D. Wofsy; Christopher J. Cillié

(57) ABSTRACT

A method of enhancing an image includes displaying an image, receiving eye-tracking information associated with the displayed image, and identifying a region of interest in the displayed image using the eye tracking information. The method further includes enhancing the region of interest and displaying the enhanced region of interest adjacent to or superimposed upon an unenhanced region of the displayed image.

15 Claims, 3 Drawing Sheets

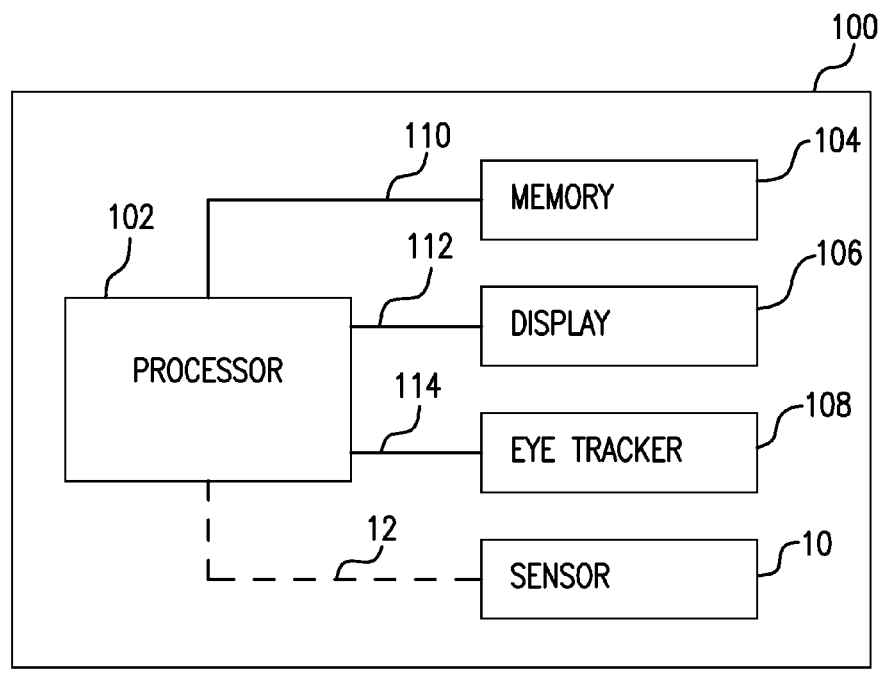
FIG. 1
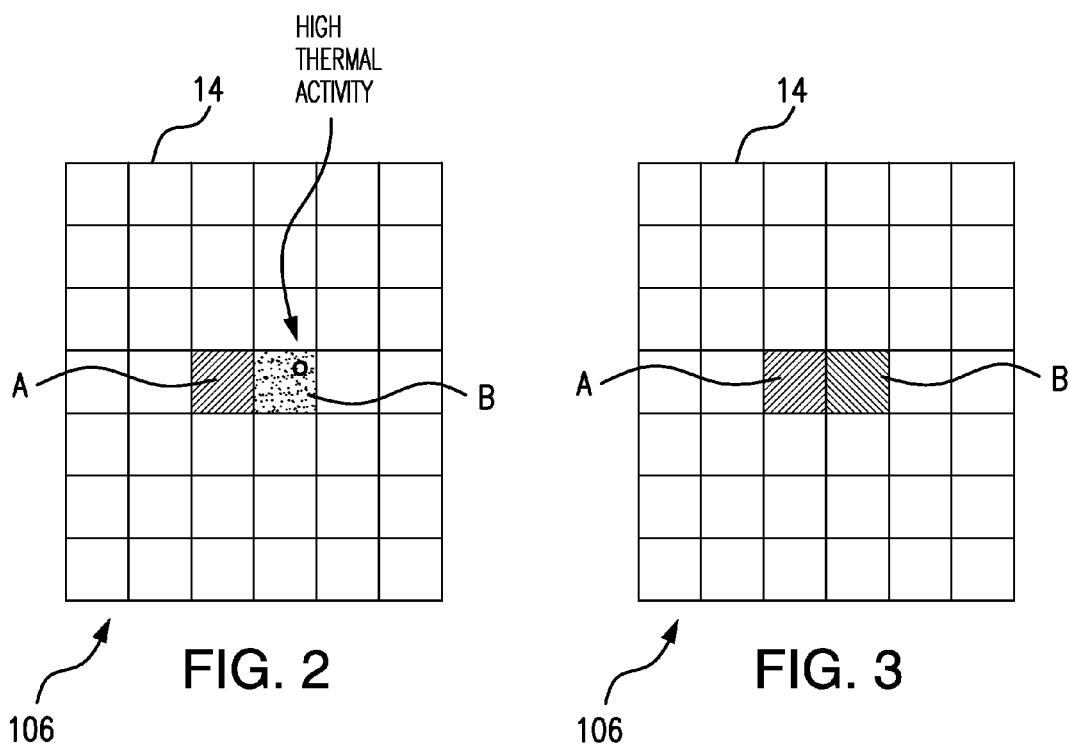
FIG. 2
FIG. 3

SYSTEMS AND METHODS FOR ENHANCING DISPLAYED IMAGES

BACKGROUND OF THE INVENTION

1. Field of the Invention

The present disclosure generally relates to imaging, and more particularly to systems and methods for enhancing a displayed image.

2. Description of Related Art

Conventional image acquisition systems can acquire image data with greater tonal (brightness) dynamic range than can be presented using conventional softcopy display monitors, which are generally limited to distinguishing only 8-bits/channel (256 grey shades). For that reason, conventional image processing systems typically compress the tonal range of high-dynamic range data (i.e. data with more than 8 bits per channel) for display on conventional softcopy display monitors for first-phase image analysis. While this process can allow for relatively rapid review and exploitation of information contained in an image, the tone scale compression can remove subtle contrast information or very bright or very dark details in the image. For example, in shortwave infrared images acquired during periods of low ambient illumination, small regions of relatively high or relatively low thermal activity can lose information when displayed due to the tendency of conventional tonal compression methodologies to present regions of high thermal activity at the same high brightness level (i.e. blooming) and areas of low thermal activity with the same low brightness level (i.e. dark data clipping). And while some information loss can be recovered through manual manipulation of the acquired image data using conventional image enhancement methods that affect the entire image, such manipulations or enhancement methods can be prohibitively time consuming or otherwise impair the ability of a viewer to rapidly exploit the information contained in the acquired image data.

Such conventional methods and systems have generally been considered satisfactory for their intended purpose. However, there is still a need in the art for improved systems and methods of image enhancement. The present disclosure provides a solution for this need.

SUMMARY OF THE INVENTION

A method of enhancing an image includes displaying an image, receiving eye-tracking information associated with the displayed image, and identifying a region of interest in the displayed image using the eye tracking information. The method further includes enhancing the region of interest and displaying the enhanced region of interest adjacent to (or superimposed upon) an unenhanced region of the displayed image.

In certain embodiments, the method further includes acquiring an image of a scene at first bit-depth resolution and displaying the image at a second bit-depth resolution. The second resolution of the displayed image can be less than the first resolution otherwise available in the acquired image data. The acquired image can be, for example, 12-bit or 14-bit image data and the unenhanced region of the displayed image can be scaled to an 8-bit resolution image. The enhanced image region can be an altered 8-bit enhanced image region. The method can also include preserving an image region adjacent to the enhanced image region in its initially displayed, unenhanced resolution.

In accordance with certain embodiments, enhancing the region of interest can include applying a localized, dynamic, high-dynamic range (HDR) algorithm to a portion of the image including the region of interest. The region of interest can include a region of very high or low brightness activity in relation to a level of activity in the scene within the displayed image. It is also contemplated that the method can include associating indexing information with the region of interest, such as date, time, or geographical indexing information, for example.

It is also contemplated that in certain embodiments the method can include tracking eye movement of an image viewer and measuring viewer eye dwell or fixation. Fixation measurements can be acquired for each of a plurality of image regions, and one of the plurality of image regions can be designated the region of interest based on the fixation measurements. These fixation measurements can be acquired in real time, at the same time, or subsequent to, displaying the image in unenhanced form. Fixation measurements can also be acquired at the same time or subsequent to designating and enhancing the region of interest and the region of interest can be further enhanced on the basis of fixation time at the same time, or subsequent to, displaying the enhanced image.

A system for enhancing an image includes a processor operatively associated with an eye tracker and a display and a memory communicative with the processor. The memory has instructions recorded on it that cause the processor to display an image on the display, acquire fixation information associated with a plurality of image regions from the eye tracker, and designate at least one of one of the plurality of image regions as a region of interest. The instructions also cause the processor to enhance at least one region of interest and display the enhanced region(s) of interest adjacent to (or superimposed on) at least one image region in its initially displayed resolution.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of a system for enhancing a displayed image constructed in accordance with the present disclosure, showing the system elements;

FIG. 2 is a schematic view of a first image displayed on the display of FIG. 1, showing an unenhanced region of interest is the displayed image;

FIG. 3 is a schematic view of a second image displayed on the display of FIG. 1, showing an enhanced region of interest adjacent to an unenhanced region of the image;

DETAILED DESCRIPTION OF THE PREFERRED EMBODIMENTS

Figure 4:
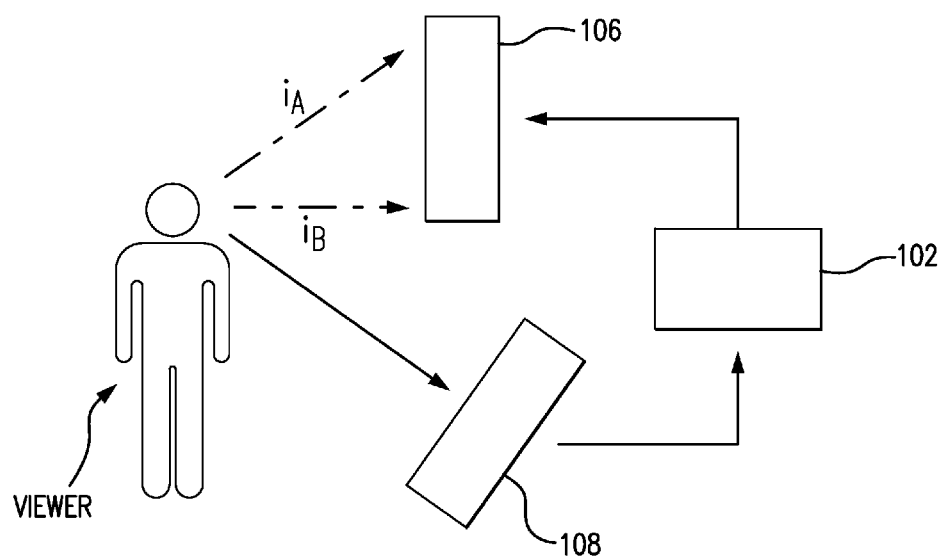
FIG. 4 is a schematic view of an eye tracker of the system of FIG. 1, showing the eye tracker acquiring eye dwell (or fixation) information associated with a plurality of image regions.

Reference will now be made to the drawings wherein like reference numerals identify similar structural features or aspects of the subject disclosure. For purposes of explanation and illustration, and not limitation, a partial view of an exemplary embodiment of the image enhancement system in accordance with the disclosure is shown in FIG. 1 and is designated generally by reference character 100. Other embodiments of systems and methods for enhancing an image in accordance with the disclosure, or aspects thereof, are provided in FIGS. 2-5, as will be described. The systems and methods described herein can be used for selectively enhancing portions of images, such as infrared images.

With reference to FIG. 1, image enhancement system 100 is shown. Image enhancement system 100 includes a processor 102, a memory 104, a display 106, and an eye tracker 108. Processor 102 is communicative with memory 104 through a link 110. Processor 102 is also communicative and operatively associated with display 106 through a link 112. Processor 102 is operatively associated with eye tracker 108 through a link 114. Optionally, image enhancement system 100 includes a sensor 10 which is configured for acquiring image data and which is communicative with processor 102 through a link 12. Sensor 10 can be either an electro-optical monochrome, color, or multispectral sensor, a long wave (LWIR) or short wave (SWIR) infrared sensor configured for acquiring image data during intervals of relatively low or high exposure conditions, or a synthetic aperture radar (SAR) system, imaging through certain types of obstructions.

Memory 104 is a machine-readable, non-transitory memory having instructions recorded on memory 104 that, when read by a processor, cause the processor to take certain actions. As illustrated in FIG. 1, instructions recorded on memory 104 cause processor 102 to display an image on display 106 by reconstructing an image from image data. The instructions recorded on memory 104 further cause processor 102 to acquire viewer eye dwell information associated with a plurality of image regions A and B (shown in FIG. 2) from eye tracker 108. Based on the eye dwell information, one of the plurality of image regions is designated a region of interest B (shown in FIG. 2). Once designated as a region of interest, the instructions further cause the processor to enhance the region of interest B (shown in FIG. 2) by including information associated with the region of interest present in the image data set and excluded in the original display of the region. This may be done by shifting the mean exposure of the region, such as by substituting a different bit range associated with the region of interest for the bit range originally presented, or by applying a high-dynamic range (HDR) enhancement algorithm to adjust the image contrast within the region of interest.

In embodiments, display 106 has an output brightness dynamic range that is less than the dynamic range present in image data acquired by sensor 10. The image data therefore has a greater brightness distribution than can be represented on display 106. Instructions recorded on memory 104 cause processor 102 to split acquired image data into a plurality of 8-bit data sets for each region of the image, each data set having a different mean exposure. Display 106 displays an image constructed from the image data with 8-bit resolution using one of the exposures, or a compressed tone scale by collapsing the original bit depth into an 8-bit output range. As the viewer's eye dwells in an orientation toward one of the regions, image enhancement system 100 designates it a region of interest, and substitutes another of the data sets with a different exposure in the region, or the resulting HDR embodiment resulting from HDR processing of the three 8-bit images for the initially displayed data set. This substitution changes the tonal presentation within the region of interest, potentially making visible detail present in the image data set but not initially discernable to a viewer of the image and region of interest. In this respect the exposure of region of interest is change while the exposure of adjacent regions is preserved.

For example, sensor 10 acquires image data with 12-bit resolution. Image enhancement system 100 splits the acquired 12-bit image data into three 8-bit data sets with different exposure ranges or mean exposures. A first (lowest) exposure includes bits 1-8, a second (mid) exposure includes bits 3-10, and a third (highest) exposure includes bits 5-12. Initially, a first region A (shown in FIG. 2) and a second region B (shown in FIG. 2) are displayed using the first exposure, e.g. bits 1-8. Second region B represents a portion of the imaged scene having a relatively high level of thermal activity, and therefore appears as a very bright region within the image portion of uniform intensity. As the viewer fixates his or her eyes on second region B, image enhancement system 100 designates second region B a region of interest and applies a localized real-time HDR algorithm to second region B.

It is contemplated that the HDR algorithm applied by image enhancement system 100 substitutes the image data forming second region B, i.e. first exposure (bits 1-8), with image data from second exposure (bits 3-10). This changes the exposure range displayed in second region B, and can make information (detail) not present in second region B as originally displayed subsequently discernable to the viewer. Fixation (eye dwell) of predetermined duration causes application of the HDR algorithm locally, to second region B, while the exposure of first region A is preserved. As will be appreciated, the HDR algorithm can be dynamically applied such that successive portions of the image are enhanced as the viewer fixates on different regions of image 14. As will also be appreciated by those skilled in the art, other image data splits on the basis of exposure are possible within the scope of the present disclosure.

With reference to FIG. 2, display 106 is shown with a displayed image 14. Image 14 is an image of a scene of relatively high or low thermal activity and includes a first image region A and second region B arranged on an XY grid. As illustrated, first and second regions A and B share a common exposure range or mean exposure. Because second region B includes a portion of the image including high thermal activity, information present in the underlying image data set is not discernable to a viewer of image 14. With reference to FIG. 3, image 14 is shown following enhancement. Second region B is displayed with a different exposure range or mean exposure value than first region. This enables detail present in the image scene to be visible in enhanced second region B (shown in FIG. 3) that may not be visible in first region A.

In embodiments, image 14 as illustrated in FIG. 2 is initially displayed with a common exposure range or mean exposure within each displayed region. Viewer eye dwell associated with (i.e. oriented toward) one of the plurality of the displayed regions causes image enhancement system 100 to designate the region a region of interest and re-display the region as computed from the HDR representation of the image, providing a different exposure range or mean for the region of interest. This changes the level of detail cognizable in the image to the user. In embodiments, the HDR algorithm selectively (or, in certain embodiments, automatically) utilizes the three 8-bit images created from the original higher bit-depth image to derive an enhanced (or optimized) presentation of the region of interest. It is envisioned that the transition between the enhanced and unenhanced regions will be via Gaussian blending or other smoothing operation in a boundary region between the enhanced and unenhanced regions over a predetermined extent based on histogram data collected radially from the central visual focus location identified from the eye tracker measurements.

With reference to FIG. 4, eye tracker 108 is shown acquiring eye fixation information associated with image and second regions A and B of the image displayed on display 106. As the viewer's eye dwell in an orientation towards first image region A, eye tracker 108 measures the time interval during which the viewer's eyes are oriented toward image first region A. If eye fixation time is above a predetermined time threshold T, processor 102 applies an HDR algorithm to region A and presents it as an enhanced image region for viewer review. As the viewer's eyes shift in orientation toward image second region B, eye tracker 108 communicates duration of eye dwell orientation toward region A to processor 102 and measures the time interval during which the viewer's eyes are oriented toward image second region B. As the viewer's eyes shift in orientation to another image region, eye tracker 108 communicates duration of eye dwell orientation toward region B. If the fixation time for region B is not above the pre-determined time threshold T, no enhancement is computed for region B. Once eye tracker measurements indicate that the viewer's gaze has moved away from an enhanced region of interest, e.g. region A, the presented image can revert to the originally presented image. The viewer has the option to restore the previously presented enhanced image regions through user input to processor 102. Image enhancement can be performed using an HDR image enhancement algorithm (or process) such as those described in U.S. Pat. No. 8,072,502, the contents of which are incorporated herein in their entirety.

Since viewer fixation in an image generally corresponds to important details or activity of interest in the scene, these fixation regions can provide additional information about regions of the image that are likely to contain important information of analytical interest. If the imagery and display are adequately geo-referenced, such as through calibration to latitude and longitude for example, the fixation region coordinates can be used to store these areas for later retrieval or used as locators for additional database searches to retrieve collateral information or archived imagery.

Figure 5:
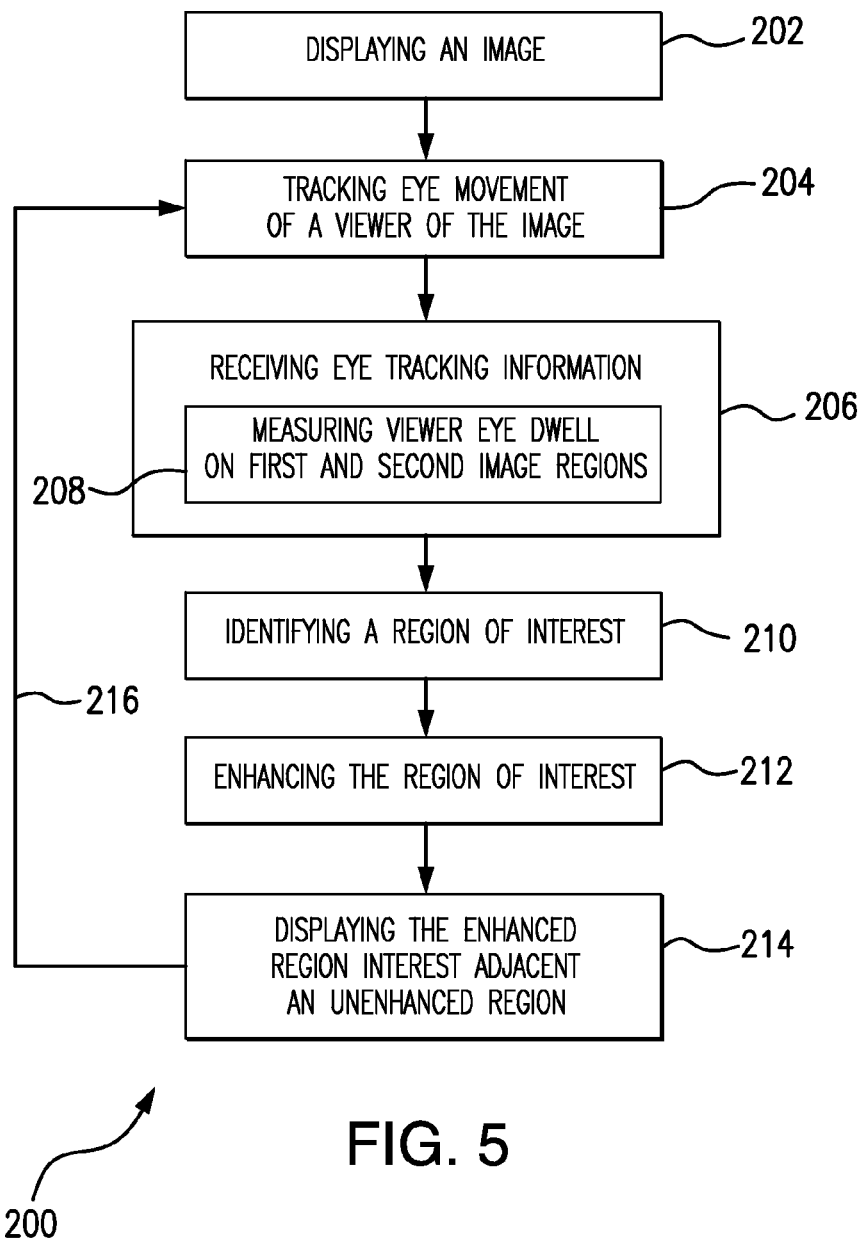
FIG. 5 is a process flow diagram of a method of enhancing a displayed image, showing steps of the method, according to an embodiment.

With reference to FIG. 5, a method 200 of enhancing a displayed image is shown. Method 200 includes a step 202 for displaying an image on an image display, a step 204 for tracking eye movement of an image viewer using an image viewer, and a step 206 for receiving eye tracking information from the eye tracker which, in certain embodiments, further includes a step 208 for measuring viewer eye (fixation time or interval) as the image is being exploited. In embodiments, method 200 repetitively measures eye dwell (fixation) as a viewer moves his or her eyes over the displayed image, iteratively associating eye dwell measurements with a progressively greater number of image regions. It is to be understood that, in embodiments, the method increments a previously acquired eye dwell measurement when a viewer orients his or her eyes to a previously viewed region of the displayed image. Method 200 further includes a step 210 for identifying a region of interest in the displayed image using the eye tracking information, such as when the fixation time has exceeded a predetermined time threshold T for example, a step 212 for enhancing the region of interest, and a step 214 for displaying the enhanced region of interest either superimposed over or adjacent to an unenhanced region in the displayed image. Method 200 can additionally include 216 for iteratively displaying (with the option of subsequently replacing) a plurality of enhanced regions of interest in the displayed image, such as by continuously tracking the viewer's eyes as they traverse the displayed image.

Embodiments of the image enhancement systems and methods of enhancing an image described herein can provide an image viewer with rapid enhancement of portions of an image that otherwise would be presented with loss of information (detail). The enhancement algorithm is applied to the displayed image selectively, one or more regions of interest being enhanced while other image portions are preserved at their originally display quality. The enhancement algorithm can also be applied to the image dynamically, in concert with user eye movement (or dwell) over the displayed image. This potentially reduces time, bandwidth consumption, and/or processing power necessary to display imagery presented on the display. The enhancement algorithm can also be applied in real time and without user intervention, potentially improving first-phase image exploitation accuracy as well as analysis process throughput by removing or reducing the need for manual manipulation of raw image data. As will be appreciated, this technique can be useful in images containing areas of strong thermal activity (i.e. relatively high exposure), or regions of the image containing critical detail in very dark (i.e. relatively low exposure) areas of the image.

Embodiments of the image enhancement systems and methods of enhancing an image described herein can be implemented in digital electronic circuitry, or in computer software, firmware, or hardware, including the structures disclosed in this specification and their structural equivalents, or in combinations of them. Embodiments of the image enhancement systems and methods of enhancing an image can be implemented as one or more computer program products, i.e., one or more modules of computer program instructions encoded on a computer-readable medium for execution by, or to control the operation of, data processing apparatus. The computer-readable medium can be a machine-readable device, e.g., a machine-readable storage device, storage medium, or memory device, or multiple ones of them; or it can be a tangible machine-readable propagated signal. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The image enhancement systems and method of enhancing an image of the present disclosure, as described above and shown in the drawings, provide systems and methods for enhancing displayed images with superior properties including selective and dynamic enhancement of portions of the image of interest to a viewer. This can provide improved first-phase image exploitation by increasing image throughput through the image assessment process by reducing the need for manual image enhancement. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of enhancing an image, comprising:
acquiring image data;
splitting the image data into a low exposure image data set, a mid-exposure image data set, and a high exposure image data set;
displaying an image using the low exposure image data set;
receiving eye-tracking information associated with the displayed image;
identifying a region of interest in the image using the eye tracking information;
enhancing the region of interest, wherein enhancing the region of interest includes substituting low exposure image data within the region of interest using image data from the mid-exposure image data; and
displaying the enhanced region of interest adjacent to or superimposed on an unenhanced region in a displayed image such that the displayed image in the region of interest has a higher mean exposure than the displayed image outside of the region of interest.

2. A method as recited in claim 1, further including acquiring an image of a scene at first dynamic range or bit depth resolution, wherein displaying the image includes displaying the image at a second resolution dynamic range or bit depth.

3. A method as recited in claim 2, wherein the second dynamic range or bit depth resolution is less than the first dynamic range or bit depth resolution.

4. A method as recited in claim 2, wherein the acquired image is a 12-bit or 14-bit image, wherein the unenhanced region of the displayed image is an 8-bit image region, wherein the enhanced region of the displayed image is an 8-bit image region.

5. A method as recited in claim 1, further including:
tracking eye movement of an image viewer; and
measuring viewer eye dwell on a first image region and a second image region; and
designating one of the first and second image regions the region of interest based on the measured eye dwell.

6. A method as recited in claim 5, further including designating the region of interest using median eye dwell duration while orientated at a plurality of image regions including the first and second image portions.

7. A method as recited in claim 5, further including measuring eye dwell in real time subsequent to displaying the image.

8. A method as recited in claim 7, further including measuring eye dwell or fixation subsequent to enhancing the region of interest, and further enhancing the image based on eye dwell on the enhanced, displayed region of interest.

9. A method as recited in claim 1, wherein enhancing the region of interest includes applying a localized, dynamic, high dynamic range algorithm to the region of interest.

10. A method as recited in claim 1, wherein the region of interest includes at least one image characteristic that corresponds to a relatively bright or a relatively dark portion of the displayed image.

11. A method as recited in claim 1, further including associating at least one of geographical-based, time-based, activity-based, or user-defined indexing information with the region of interest.

12. A method as recited in claim 1, further including preserving an image region adjacent the enhanced image region in its initially displayed resolution.

13. An image enhancement system, comprising:
a processor operatively associated with an eye tracker and a display; and
a memory communicative with the processor, wherein the memory has instructions recorded thereon that, when read by the processor, cause the processor to:
acquiring image data;
splitting the image data into a low exposure image data set, a mid-exposure image data set, and a high exposure image data set;
display an image using the low exposure image data set;
acquire eye dwell information associated with a plurality of image regions;
identify one of the plurality of image regions as a region of interest using the eye dwell information;
enhance the region of interest, wherein enhancing the region of interest includes substituting low exposure image data within the region of interest using image data from the mid-exposure image data; and
display the enhanced region of interest adjacent to an unenhanced image region such that the displayed image in the region of interest has a higher mean exposure than the displayed image outside of the region of interest.

14. A system as recited in claim 13, wherein instructions further cause the processor to associate geographical indexing information with the region of interest.

15. A system as recited in claim 14, wherein the instructions cause the processor to dynamically designate a second region of interest in the displayed image based on eye dwell information acquired subsequent to display of a first region of interest is the image.

* * * * *